United States Patent
Kodama et al.

[11] Patent Number: 5,942,260
[45] Date of Patent: Aug. 24, 1999

[54] EXTRUDING DEVICE FOR PRODUCING HONEYCOMB STRUCTURE

[75] Inventors: Kunihiro Kodama; Hiroshi Furuhashi, both of Nagoya; Syozo Tanida, Anjo; Masakazu Murata, Oobu, all of Japan

[73] Assignee: Nippondenso Co., Ltd., Kariya, Japan

[21] Appl. No.: 08/715,516

[22] Filed: Sep. 18, 1996

[30] Foreign Application Priority Data

Sep. 19, 1995 [JP] Japan .................................. 7-240122

[51] Int. Cl.[6] .................................................. B29C 47/12
[52] U.S. Cl. ................... 425/190; 264/177.12; 425/380; 425/461; 425/464; 425/467
[58] Field of Search ................ 425/190, 382 R, 425/461, 465, 466, 467, 380, 464; 264/177.12

[56] References Cited

U.S. PATENT DOCUMENTS

| | | | |
|---|---|---|---|
| 3,919,384 | 11/1975 | Cantaloupe et al. | 264/177.12 |
| 4,349,329 | 9/1982 | Naito et al. | 425/461 |
| 4,814,187 | 3/1989 | Inoue et al. | 264/177.12 |
| 5,089,203 | 2/1992 | Kragle | 264/177.11 |
| 5,219,509 | 6/1993 | Cocchetto et al. | 264/177.12 |
| 5,256,054 | 10/1993 | Cocchetto et al. | 425/462 |

FOREIGN PATENT DOCUMENTS

| | | |
|---|---|---|
| 54-28850 | 9/1979 | Japan . |
| 3-17644 | 3/1991 | Japan . |
| 7-52129 | 2/1995 | Japan . |
| 7-60880 | 3/1995 | Japan . |

Primary Examiner—Harold Pyon
Assistant Examiner—Joseph Leyson
Attorney, Agent, or Firm—Pillsbury Madison & Sutro LLP

[57] ABSTRACT

An extruding apparatus for producing a honeycomb structure having cell walls and a skin. The apparatus includes a die (10) and a mask (20). The mask (20) is of an annular shape of an inner diameter (D1) and is located on an annular recess formed by a taper surface (19) and an outlet end surface (18b) of the die. The mask (20) has a top surface (21), which is in contact with an outlet end surface (18b) of the die (10), so that the degree of the opening of feed holes (11a), (11b) and (11c) are controlled by the particular shape of the end surface (21). A change of the mask to the one as shown by a phantom line (30) allows the shape of the top surface to be changed from the one shown by (21) to the one shown by (31), which allows the degree of the opening of the feed holes (11a), (11b) and (11c) to be desirably controlled.

12 Claims, 4 Drawing Sheets

EXTRUDING DEVICE FOR PRODUCING HONEYCOMB STRUCTURE

BACKGROUND OF THE INVENTION

1. Field of the Invention

The present invention relates to an extruding device for producing a honeycomb structure for use, for example, in an exhaust gas purifying device such as a catalytic converter for an automobile provided, for example, with an internal combustion engine.

2. Description of Related Art

A honeycomb structure is used for a catalytic converter in an automobile provided with an internal combustion engine. Such a honeycomb structure is, when it is constructed from a ceramic material, used as a catalyst carrier. In such a ceramic honeycomb structure, an integral construction has been proposed, which is constructed by a skin and cell walls for creating cells, wherein a thickness of the skin is larger than that of the cell wall, in order to obtain a desired mechanical strength.

In order to produce such a honeycomb structure, various techniques have been proposed such as those disclosed in Japanese examined patent publication No. 54-28850, Japanese examined patent publication No. 3-17644, and Japanese unexamined patent publication No. 7-52129. Japanese examined patent publication No. 54-28850 discloses an extruder apparatus for obtaining a honeycomb structure, which comprises an extrusion die formed with extrusion holes for extruding a honeycomb structure therefrom, the extrusion die having, at its bottom end surface, a peripheral portion inclined upwardly. The extruder apparatus further includes a control plate having an inclined surface faced with the inclined surface of the die. By this structure, an integrated honeycomb structure having a skin of a thickness more than four times the thickness of the cell wall can be obtained. In this prior art, a change in an outer diameter of the produced honeycomb structure, which is necessary for adjusting a variation in a shrinkage as generated during a firing of the product, is done by changing a shape of an adjusting plate, which is arranged at a location upstream from the feed passageways of the die or by changing the shape of the die itself. However, a change of such an adjustment plate requires a removal of the die due to the fact that the adjusting plate is located upstream from the die, which makes the working steps for an adjustment of the product diameter to be complicated.

In Japanese examined patent publication No. 3-17644, a die is proposed, which is, at its outer periphery, provided with a taper shaped secondary surface which inclined outwardly, and a mask having an outlet end which is tapered at the same angle as that of the tapered secondary surface, thereby preventing a skin of the product from collapsing. An adjustment of an outer diameter of the product for accommodating a variation in a shrinkage of the product during a firing is done by using a mask, so that a degree of the opening of a central plate in an annular back plate contacting with an inlet end of the mask is changed, i.e., the number of the feed holes to which the material is introduced is increased or reduced, so that an amount of flow of the material flowing into a gap between the secondary surface and the inlet surface of the mask is controlled. However, in this prior art, replacement of both the die and back plate is necessary every time a change in the outer diameter of the product becomes necessary. A temporary removal of the die is necessary in order to allow the back plate to be replaced due to the fact that the back plate is located upstream from the die, thereby causing the working steps for an adjustment of the product diameter to be complicated.

Japanese unexamined patent publication No. 7-52129 discloses a die having an outer tapered surface and a control plate facing the tapered surface of the die. In a space formed between the inclined surface and the control plate, the volume of the portion of the space located inwardly is smaller than that located outwardly. Due to this arrangement, an extrusion of a product, which has an uniform thickness of the skin so long as it is less than 5 times of the thickness of the cell walls, is possible. However, in this structure, an adjustment of an amount of flow of a material for changing an outer diameter of the product is, similar to the above mentioned prior arts, done by means of the back plate or masking plate which is located upstream from the die, which causes the working steps for changing the outer diameter to be difficult.

In Japanese Unexamined Patent Publication No. 7-60880, a die having, at its outer periphery, passageways for extruding portions of honeycomb structure corresponding to the cell walls and a flow control plate faced with an inclined surface of the die are disclosed. The surface of the die at the outlet ends of the passageways is outwardly inclined, thereby preventing the cell walls from being deformed at the outer periphery of the product, while obtaining an uniform thickness of the outer wall of the product. However, the prior art is defective in that the machining of the discharge passageways in the die is difficult. Furthermore, the arrangement of the back plate for adjustment of the flow amount of the material located upstream from the die causes the working to be complicated and difficult when the adjustment of the outer diameter of the product is required.

SUMMARY OF THE INVENTION

An object of the present invention is to provide an extruding apparatus, for producing a honeycomb structure, which makes the working steps for replacement of a product easy.

Another object of the present invention is to provide an extruding apparatus, for producing a honeycomb structure, capable of extruding a honeycomb structure having a uniform thickness of a skin larger than the thickness of the cell walls.

In order to attain the above-mentioned objects, a extruding apparatus is provided which comprises an extruding die having axially spaced inlet and outlet ends, the extruding die including an inner portion having a plurality of first feed holes opened the inlet end for receiving a material to be extruded and a plurality of grooves connected to the feed holes and opened to the outlet end for discharging the material, the outlet end having, at an outer periphery of the inner portion, a rearwardly tapered surface, and an outer portion located radially outwardly from the inner portion, the outer portion having a plurality of second feed holes extending between said inlet and outlet ends; and a mask of a ring shaped mask located on one side of the die adjacent the outlet end of the die, so that a skin formation passageway is formed between the die and the mask, the mask having, at an end adjacent the die, an inner tapered surface faced with the tapered surface of the die and an outer flat surface defining a flow control surface which is in contact with the outer portion of the die, so that at least part of said second feed holes are blocked. With such a structure, the flow control surface of the mask can close all of or part of the second feed holes at their outlet ends. As a result, control of the degree of the opening of the second feed holes at their outlet ends becomes possible by providing a plurality of masks with different shapes of flow control surfaces and by selecting a desired one of the masks, thereby obtaining a desired amount of the material passed through the skin formation passageway for constructing the skin of the honeycomb structure. Namely, the adjustment of the amount flowing into the skin formation passageway is done so that the speed of the material issued from the cell formation grooves for constructing the cells of the honeycomb structure is equalized to that of the speed of the material issued from the skin formation passageway, thereby obtaining a honeycomb structure without any distortion or defects in the skin and the cell walls. Furthermore, an adjustment of the outer diameter of the product in accordance with the variation in the shrinkage of the honeycomb structure generated when it is subjected to a firing can be done easily by replacing the mask located at the outlet side of the die.

In accordance with a further feature of the invention, the material for constructing the honeycomb structure is supplied to all of the first and the second feed holes. Thus, a member located on the inlet side of the die in the prior art is unnecessary, which is otherwise necessary for controlling a supply or closure of the material to the first or second feed holes in accordance with the diameter of the honeycomb structure to be created, thereby simplifying the working steps as required for adjusting the shape of the product.

In accordance with a further feature of the invention, the tapered surface of the die and the tapered surface of the mask are parallel or converge in the direction of the flow of the material. As a result, a stabilized flow of the material for constructing the skin is obtained when compared with the prior art structure where the tapered surfaces are arranged so as to diverge in the direction of the flow of the material. Thus, the present invention makes it possible for a uniform thickness of the skin of the honeycomb structure maintained.

In accordance with a further feature of the invention, some of the first feed holes opened to the tapered surface have an inner diameter which is smaller than that of the remaining second feed holes, so that an extrusion resistance is obtained at said part of the first feed holes, thereby canceling a reduction in the extrusion resistance as generated by a reduction in the length of the feed holes opened to the tapered surface. As a result, an equalization becomes possible between the speed of the extrusion of the material via said part of the second feed holes and the speed of the extrusion of the material via the remaining part of the second feed holes, thereby obtaining a honeycomb structure with reduced distortion as and defects as the cell walls and the skin of the honeycomb structure.

Providing an apparatus wherein the tapered surface of the die forms an angle with respect to an end surface of the die which is in a range between 30° and 60° allows the desired inclined arrangement of the tapered wall of the die to be obtained. As a result, a difficulty in machining or reduction in a strength are eliminated, which would otherwise occur when the setting of the angle is too small. Furthermore, a deformation of the cell wall is eliminated, which would otherwise occur when the setting of the angle is too large.

In accordance with a further feature of the invention, control the degree of the opening of the second feed holes at their outlet ends by changing the size of the flow control surface of the mask is done while keeping the predetermined minimum distance between the tapered surfaces of the die and the mask, thereby adjusting an outer diameter of the honeycomb structure, while maintaining the predetermined thickness of the skin of the honeycomb structure. As a result, the working steps for a change of the outer diameter of the product, which are necessitated by the presence of a variation in the shrinkage generated during firing of the product, are simplified.

In accordance with a further feature of the invention, control of the degree of the opening of the second feed holes at their outlet ends by changing the size of the flow control surface of the mask is done by increasing or decreasing the minimum distance between the tapered surfaces of the die and mask, while keeping a predetermined position of an inner surface of the mask, thereby changing the thickness of the skin of the honeycomb structure, while keeping a predetermined outer diameter thereof. In other words, the working steps for adjustment of the thickness of the skin of the honeycomb structure, for giving thereto a desired mechanical strength, can be simplified.

DESCRIPTION OF PREFERRED EMBODIMENTS

First Embodiment

Figure 1:
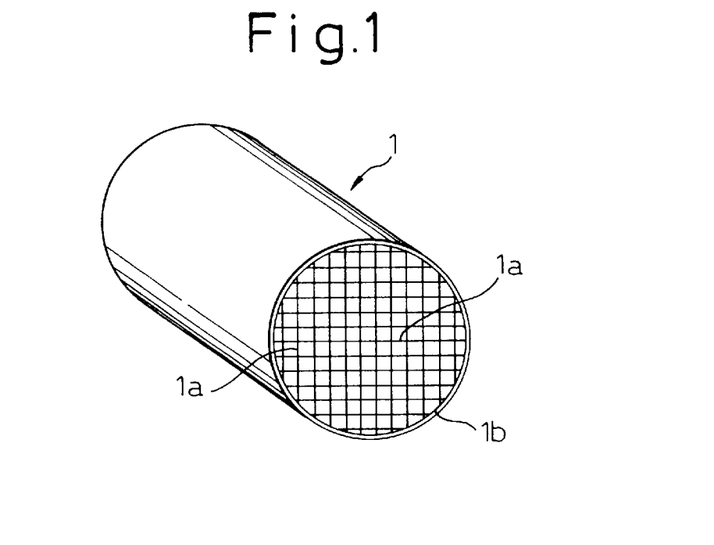
FIG. 1 is a schematic perspective view of a honeycomb structure.

In FIG. 1, a honeycomb structure 1 is constructed by cell walls 1a extending in directions which cross each other for defining a plurality of cells, each of which extends axially and is of a rectangular cross sectional shape, and a skin 1b of a thin tubular shape which is integrally connected to the cell walls 1a at their ends for supporting the cell walls 1a and for strengthening the cell walls 1a with respect to an external force.

As will be described later, the cell walls 1a are extruded from cell formation grooves 17 in a die 10 and have a thickness which is 200 µm or less.

As will be also described later, the skin 1b is extruded from a skin formation passageway 29 (FIG. 2) so that the skin 1b is integral with respect to the cell walls 1a, while the thickness of the skin 1b is twice of that of the cell wall 1a or more. Due to the thickness of the skin 1b being two or more times the thickness of the cell wall 1a, an increased mechanical strength of the honeycomb structure 1 is obtained.

Figure 2:
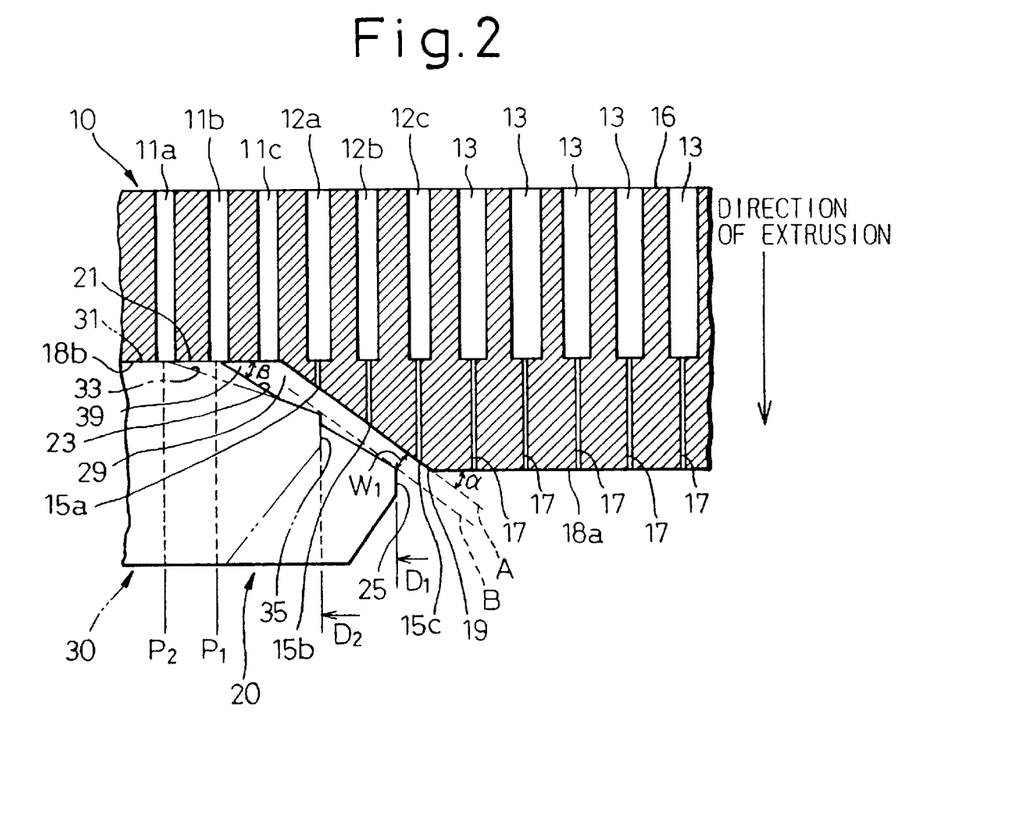
FIG. 2 is a cross-sectional view of an extruding apparatus according to a first embodiment of the present invention.

In FIG. 2, showing an extruding apparatus according to the present invention, a reference numeral 10 denotes a die which includes: a plurality of cell formation grooves 15a, 15b, 15c and 17, which are, in a transverse cross section, connected with each other so as to form a grid shape; main or first feed holes 12a, 12b, 12c and 13, which are, at their bottom ends, in communication with the cell formation grooves 15a, 15b, 15c and 17 and are at their top ends opened for introduction of a material to be extruded from its source; and additional or second feed holes 11a, 11b and 11c, which are located radially outwardly from the feed holes 12a, 12b, 12c and 13 without communicating with any of the cell formation grooves 15a, 15b, 15c and 17.

The die 10 forms, at the end adjacent the source of the extruded material, an inlet end surface (feed side surface) 16, which extends transversely to a flow of the extruded material fed from the source (not shown). The die 10 forms, at the end away from the feed side surface 16, an circular end surface (extrude side surface) 18a extending transverse to the flow of the extruded material, an annular, intermediate taper surface 19 which is located outward from the end surface 18a and inclined upwardly therefrom, and an annular peripheral surface 18b extending transverse to the flow of the extruded material.

The outlet end surface 18a, which is centrally located, forms a circular shape to which the cell formation grooves 17 are opened as shown in FIG. 2. Thus, the portion of the honeycomb structure 1, which corresponds to its axial core thereof, is formed by the material extruded from the grooves 17. The intermediate tapered surface 19 is inclined to the horizontal central surface 18a at an angle $\alpha$. Opened to the tapered surface 19 are the cell formation grooves 15a, 15b and 15c. The skin outlet end surface 18b of an annular shape is located around the tapered surface 19, and the second feed holes 11a, 11b and 11c are opened to the skin outlet end surface 19. It should be noted that a circular pillar shaped part of the die 10, the bottom end surface of which is constructed by the central surface 18a and the intermediate (tapered) surface 19, construct an inner part of the die in the claimed invention, while a tubular part of the die 10, the bottom end surface of which is constructed by the outer surface 18b, constructs an outer part of the die in the claimed invention.

It should be noted that the taper angle $\alpha$ of the surface 19 is should be kept in a range between 30 to 60°. In a condition that the value of the angle $\alpha$ is larger than 60°, a distance between the inlet and the outlet end surfaces 16 and 18a, which corresponds to an axial length of the die 10, is increased. Such an increase in the axial length of the die 10 causes the length of the cell formation grooves 15a, 15b, 15c and 17 to also be increased, which, on one hand, makes a processing of the die 10 to become difficult, and makes a force in the direction opposite the direction of the extrusion from the cell formation grooves 15a, 15b, 15c and 17 (below, material extruding resistance) to be increased, on the other hand. Such an increase in the material extruding resistance causes a force to be increased during a processing, which necessitates an increase in the strength of the die, thereby increasing a cost needed for a production of the die. Contrary to this, in a condition that the value of the taper angle $\alpha$ is smaller than 30° C., the Material extruded from the passageway 29 for the formation of the skin 1b is likely to be moved radially inwardly, thereby generating an excessive force to an outer portion of the cell walls 1a, which causes the cell walls adjacent to the skin 1b to be subjected to a deformation. Thus, it is desirable that the taper angle $\alpha$ is kept in a range between 30 to 60°.

Furthermore, it should be noted that the material feed holes 12a, 12b and 12c, which are in communication with the cell formation grooves 15a, 15b and 15c, have an inner diameter, which is smaller than that of the material feed holes 13, which are in communication with the cell formation grooves 17. In more detail, the material feed holes 12a, 12b and 12c are in communication with the cell formation grooves 15a, 15b and 15c, which are opened to the intermediate tapered surface 19 at the bottom end of the die 10. This means that an axial length of the cell formation grooves 15a, 15b and 15c is shorter than that of the cell formation grooves 17 opened to the material feed holes 13. In view of this, the flow resistance of the cell formation grooves 15a, 15b and 15c is smaller than that of the cell formation grooves 17. This small flow resistance at the cell formation grooves 15a, 15b and 15c is compensated by the above reduction in the inner diameter of the feed holes 12a, 12b and 12c opened to the cell formation grooves 15a, 15b and 15c. In other words, the inner diameter of the feed holes 12a, 12b and 12c is reduced in such a manner the resultant increase in the flow resistance is balanced by the reduction of the flow resistance by the reduction of the length of the cell formation grooves 15a, 15b and 15c. As a result of the balancing of the flow resistance, it is possible that the extrusion speed of the portion of the cell walls 1a from the cell formation grooves 17 is equalized with the extrusion speed of the portion of the cell walls 1a from the cell formation grooves 15a, 15b and 15c, thereby preventing any distortion as well as defects from being generated in the cell walls 1a and the skin 1b in the honeycomb structure 1 as produced.

Furthermore, the material feed holes 11a, 11b and 11c located radially outwardly from the material feed holes 12a, 12b and 12c have an inner diameter smaller than that of the latter. Namely, the material feed holes 11a, 11b and 11c are directly opened to the skin outlet side end surface 18b without any existence of cell formation grooves. Thus, as similar as explained with reference to the material feed holes 12a, 12b and 12c, the inner diameter of the material feed holes 11a, 11b and 11c is reduced, so that the increase in the flow resistance via the holes 11a, 11b and 11c of the reduced inner diameter is balanced with the decrease in the flow resistance due to the elimination of the cell formation grooves. As a result, the extrusion speed of the skin 1a from the skin formation passageway 29 is equalized with the extrusion speed of the cell walls 1a from the cell formation walls 15a, 15b, 15c and 17, thereby preventing any distortion as well as a defect from being generated in the cell walls 1a and the skin 1b in the honeycomb structure 1 as produced.

In FIG. 2, reference numeral 20 denotes an extrusion mask 20, which is of an annular shape of an inner diameter of $D_1$. The mask 20 is arranged in an annular recess formed by the die 10 at a location radially outwardly from the tapered surface 19 and axially below from the end surface 18b. Namely, the extrusion mask 20 is formed with a top end surface 21, which is in face to face contact with the end surface 18b of the die body 10, and with an annular tapered surface 23 located radially inwardly from the end surface 21 while inclining downwardly therefrom and an axially extending inner cylindrical surface 25. The shapes of the surfaces 21, 23 and 25 are determined in such a manner that a desired degree of opening of the feed holes 11a, 11b and 11c is obtained. Namely, in FIG. 1, an additional mask 30 of a modified shape of the mask 30 as shown by phantom lines is provided, which include a top surface 31, a tapered surface 33 and an inner surface 35. Namely, by changing from the mask 20 to the mask 30, an increase in a degree of the opening of the feed holes 11a, 11b and 11c can be obtained, thereby providing a capability for adjusting an outer diameter of the product, as fully described hereinbelow.

The main difference between the masks 20 and 30 resides in a mask inner diameter as well as a taper angle. In more detail, the modified mask 30 has an increased inner diameter $D_2$ over the inner diameter $D_1$ of the mask 20. In other words, the inner surface 35 of the mask 30 is located radially outwardly from the inner surface 25 of the mask 20. As a result, the location of the outer skin 1b of the honeycomb structure produced by the mask 30 is displaced radially outwardly over that produced the mask 20. Furthermore, the angle of the taper surface 33 of the mask 30 is changed over that of the surface 23 of the mask 20 in such a manner that a line B connecting inner top edges of the masks 20 and 30 is parallel to the tapered surface 19 of the die 10. Due to such an arrangement of the inner top edges on the line B, a minimum distance $W_1$ with respect to the die 10, which determines a thickness of the outer skin 1b of the honeycomb structure 1, is unchanged between the masks 20 and 30. Such an unchanged value of the minimum distance W1 is essential, when a change in the outer diameter of the honeycomb structure 1 is necessary while keeping the thickness of the skin 1b unchanged.

In the extruding mask 20, an angle β of the tapered surface 23 in relation to the angle α of the tapered surface 19 of the die 10 is determined such that a skin formation passageway 29 of an annular shape is formed therebetween with a width which becomes narrower nearer to the outlet end of the extruded material. This structure of the passage narrowed toward the bottom end is effective for keeping a stable flow of the material constructing the outer skin 1b of the honeycomb structure 1, thereby keeping a uniform thickness of the skin 1b. Contrary to this, if a structure were employed that the width of the passageway 29 is increased nearer to the outlet end, it is likely that the flow condition of the material in the passageway 29 is less stabilized. Finally, it should be noted that, from the view point of a stable flow condition of the material to be extruded, in place of the narrowed structure, a structure can also be employed, where the thickness of the passageway 29 is unchanged throughout the length of the flow of the material due to a parallel arrangement between the tapered surfaces 19 and 23.

Now, a relationship between a position of the mask 20 or 30 and an amount of material extruded from the feed nozzles 11a, 11b and 11c will be explained. In the case of the mask 20, a connecting point between the top surface 21 and the tapered surface 19 is located on the point $P_1$, so that the feed holes 11a are entirely blocked at their outlet ends while the feed holes 11b are half blocked at their outlet ends. Contrary to this, in the case of the mask 30, a connecting point between the top surface 31 and the tapered surface 33 is located on the point $P_2$, so that the feed holes 11a are half blocked at their outlet ends while the feed holes 11b are now completely opened at their outlet ends.

In view of the above, it is clear that the degree of the opening of the feed holes is varied between the case where the mask 20 of the reduced inner diameter $D_1$ is used and the case where the mask 30 of the increased diameter $D_2$ is used. However, an amount of the material extruded via the skin formation passageway 29 for the formation of the skin 1b of the honeycomb structure 1 is unchanged between these cases. Namely, (1) when a formation of the honeycomb structure 1 is done by using the mask 20, the material extruded from the cell formation grooves 15a and 15b flows, together with the material extruded from the feed holes 11b and 11c, through the skin formation passageway 29, and then flows on the inner cylindrical surface 25, thereby creating the skin portion 1b of the honeycomb structure 20. Contrary to this, (2) when formation of the honeycomb structure 1 is done by using the mask 30, the skin portion 1b of the honeycomb structure 1 is formed by the material extruded from the cell formation grooves 15a and the material extruded from the feed holes 11a, 11b and 11c. Namely, this material flows through the skin formation passageway 39, and then flows on the inner cylindrical surface 35, thereby creating the skin portion 1b of the honeycomb structure 20.

In the latter case (2) using the mask 30, from the cell formation grooves 15b which are for extruding a material for forming the skin 1b in the former case (1) using the mask 20, a material for forming the cell walls 1a rather than the skin 1b is now extruded, due to the fact that any masking of the cell formation grooves 15b is not done by means of the mask 30. Namely, by changing from the mask 20 to the mask 30, an increase in the number of the cell formation grooves for forming the cell walls 1a is obtained, which causes the material for forming the skin 1b to be reduced by the amount corresponding to the increased number of the cell formation grooves for forming the cell walls 1a. However, as far as the feed holes 11a and 11b are concerned, when the mask 20 is used, its upper surface 21 closes entirely the feed holes 11a and half the feed holes 11, while, when the mask 30 is used, its upper surface 31 closes only the half of the feed holes 11a. As a result, a reduction in the number of the cell wall formation grooves for the formation of the skin by using the mask 30 is compensated for by an increase in the degree of the opening of the feed holes, so that any shortage of material for forming the skin 1b does not occur. Namely, by changing from the mask 20 to the mask 30, an increased outer diameter of the honeycomb structure 1 is obtained, while keeping thickness of the skin 1b to be unchanged and preventing any distortion or defects from being created in the skin 1b.

Figure 3A:
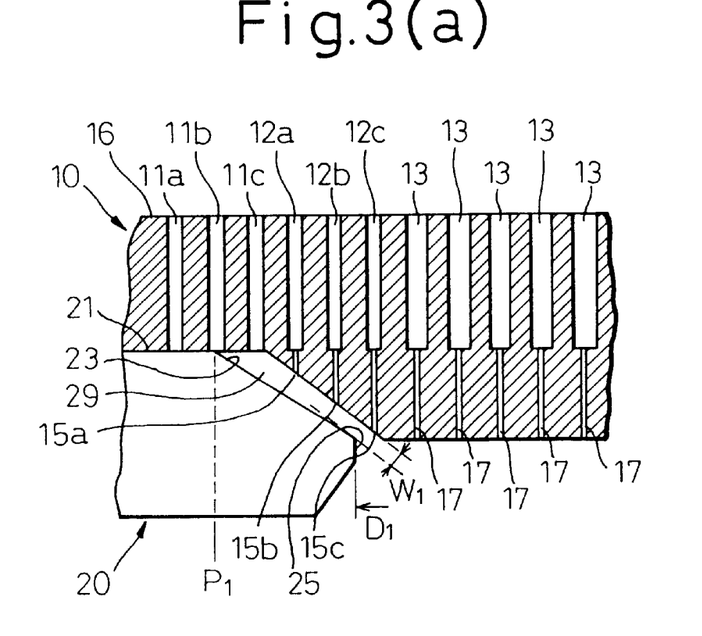
FIGS. 3(a) and 3(b) illustrate an adjustment of a diameter of the honeycomb structure by using the extruding apparatus in FIG. 2.
Figure 3B:
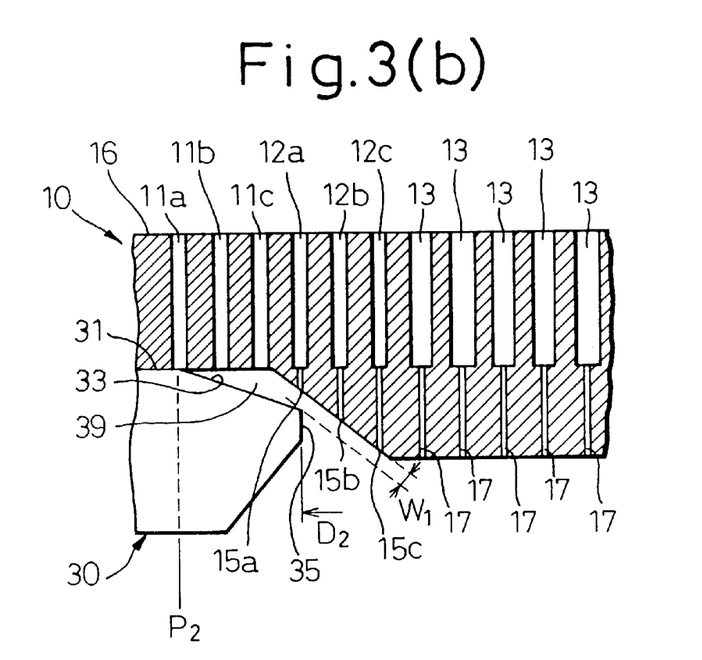

A process for forming the honeycomb structure 1 will be explained with reference to FIGS. 3(a) and (b). In FIG. 3(a), which shows a use of the mask 20, the material for the formation of the cell walls 1a and the skin 1b of the honeycomb structure 1 is fed, from the material feed end 16 of the die 10, to the material feed openings 11a, 11b, 11c and 11d, 12a, 12b and 12c, and 13. In the mask 20, the location $P_1$ of the connection of the top surface 21 with the tapered surface 23 fully closes the feed holes 11a and half closes the feed holes 11b, so that an extrusion of the material from the feed holes 11a is blocked, while the amount of the material extruded from the feed holes 11b becomes, substantially, the half that obtained when the holes 11b are fully opened. Furthermore, the material fed to the feed holes 13 and 12c, which are not masked by the mask 20, is extruded from the cell formation grooves 17 and 15c, thereby forming the cell walls 1a. The cell wall formation grooves 15c have a length which is shorter than that of the cell wall formation grooves 17. In other words, the flow resistance of the material at the cell wall formation grooves 15c is lower than that at the cell wall formation grooves 17. However, such a reduction of the flow resistance at the cell wall formation grooves 15c is compensated by the fact that the feed holes 12c in communication with the shorter (small resistance) grooves 15c is smaller than that of the feed holes 13 in communication with the longer (large resistance) grooves 17. As a result of such an equalization of the flow resistance, an equalization of the speed of the extruded material is obtained between the cell wall formation grooves 17 and the cell wall formation grooves 15c. Furthermore, simultaneously with the extrusion of the material for constructing the cell walls 1a, the material for constructing the skin 1b is also extruded. Namely, the material fed to the feed holes 11b and 11c flows directly into the skin formation passageway 29 and the material fed to the feed holes 12a and 12b flows into the skin formation passageway 29 via the masked cell wall formation grooves 15a and 15b. The material in the passageway 29 flows along the inner wall 25 of the mask 20, so that a skin 1b of a thickness corresponding to the distance $w_1$ is formed, while the skin 1b is integrated with the cell walls 1a. In short, when the mask 20 is used, a honeycomb structure of an outer diameter of $D_1$ and of a thickness of the skin of $w_1$ is extruded.

Now, a condition shown in FIG. 3(b), where the mask 30 is connected to the die 10, will be explained. The use of the mask 30 causes the inner diameter is increased to $D_2$, and the position of connection of the top surface 31 to the tapered surface 33 is changed to $P_2$. As a result, the feed holes 11b, which were fully closed when the mask 20 was used, are now half closed, and the feed holes 11b, which were half closed when the mask 20 was used, are now fully opened. As a result, the material at the inlet end surface 16 of the die 10 is fed to the feed holes 11a to 11c, 12a to 12c and 13. The material in the feed holes 12b, 12c and 13 is introduced into the cell wall formation grooves 15b, 15c and 17, respectively, so that the cell walls 1b are formed. Contrary to this, the material from the feed holes 11a to 11c is discharged directly into the skin formation passageway 39 and the material from the feed holes 12a is, via the cell formation grooves 15a masked by the mask 39, also discharged into the skin formation passageway 39. The material filling the passageway 39 is moved along the inner surface 35 of the mask 30, while forming a skin 1b of a thickness of $w_1$. In the case shown in FIG. 3(b), the material extruded from the cell formation walls 15b which created the skin 1b in the case of FIG. 3(a) now creates cell walls 1a. However, the amount of the material which is equalized to that extruded from the grooves 15b, is now additionally extruded from the holes 11a and 11b, which are not masked by the top surface 31 of the mask 30. As a result, an increased outer diameter of $D_2$ of a honeycomb structure 1 is obtained without changing the thickness $w_1$ of the skin.

It should be noted that, upon a change from the mask 30 in FIG. 3(b) to the mask 20 in FIG. 3(a), the material for forming the skin 1b is increased for an amount corresponding to that extruded from the grooves 12b, which is now masked. In order to compensate for this, control of the opening of the feed holes 11a and 11b is done, thereby reducing the extruded amount for the amount corresponding to that extruded from the grooves 12b. Thus, a change of the masks does not cause the thickness $w_1$ of the skin 1b to be unchanged, while changing the diameter.

According to the present invention, any back plate or masking plate at the material inlet surface 16 of the die 10 for controlling an amount of the material to be fed is not provided, which means that the material is fed to all of the feed holes 11a to 11c, 12a to 12c and 13 opened to the surface 16. Thus, a mere change of the mask is sufficient to cause the outer diameter of the die 10 to be changed, while keeping a desired thickness of the skin 1b of the honeycomb structure, thereby simplifying working steps for varying the size of the honeycomb structure.

Furthermore, the material feed holes 11a to 11c, 12a to 12c and 13 have inner diameters in such a manner that a desired extrusion resistance is obtained in accordance with various factors, such as a groove length as well as various condition such as whether or not they are in communication. Thus, extrusion of the cell walls 1a and the skin 1b is done at the identical speed, thereby producing honeycomb structure having no distortion nor defect in the skin 1b or in a portion of the cell walls 1b adjacent to the outer periphery.

Second Embodiment

Figure 4:
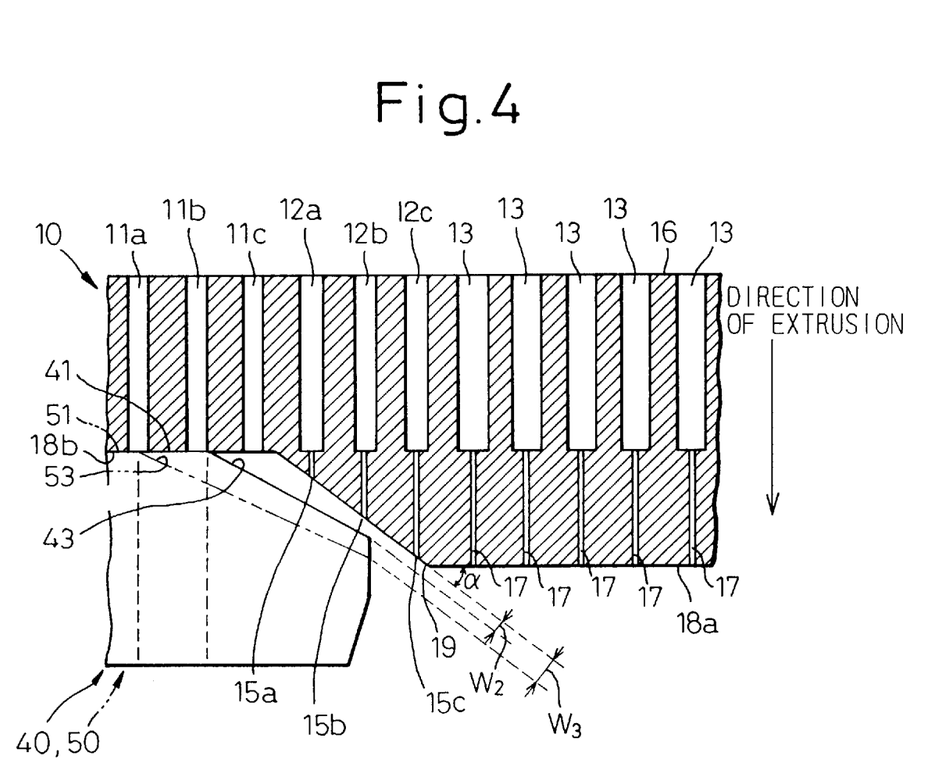
FIG. 4 is a cross-sectional view of an extruding apparatus according to a second embodiment of the present invention.
Figure 5A:
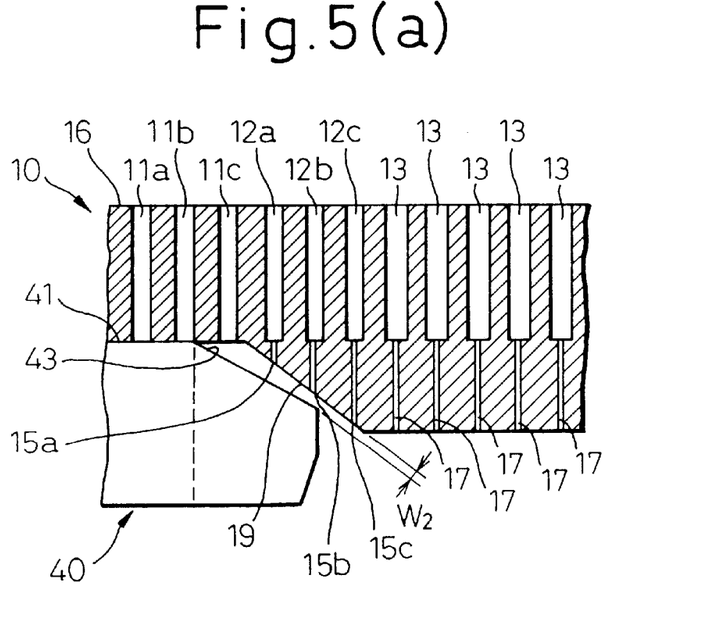
FIGS. 5(a) and 5(b) illustrate an adjustment of a thickness of a skin of the honeycomb structure by using the extruding apparatus in FIG. 4
Figure 5B:
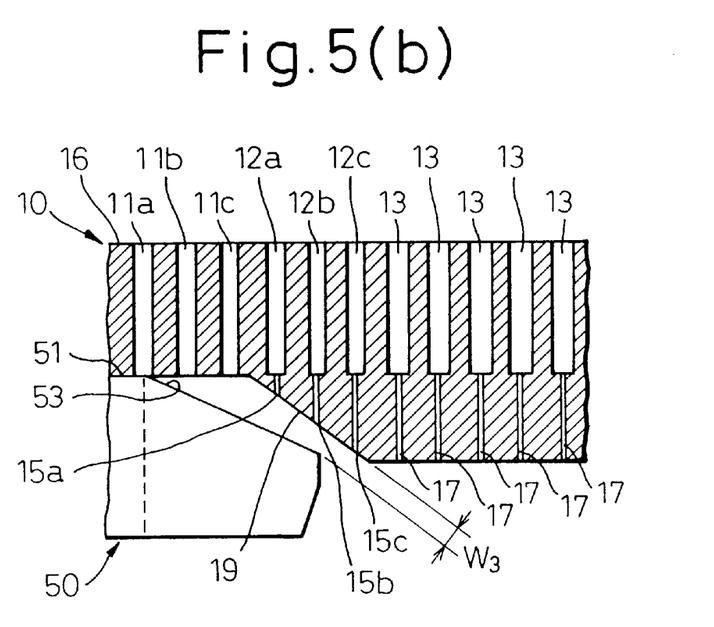

A honeycomb structure in a second embodiment will now be explained with reference to FIGS. 4 and 5(a) and 5(b), while using the same reference number for parts functioning in substantially the same manner. The second embodiment is directed to an extrusion device for extruding the honeycomb structure, capable of changing the thickness of the skin 1b of the honeycomb structure without changing its outer diameter.

In the second embodiment, a plurality of extrusion masks, such as extrusion masks 40 and 50 of annular shapes of the same inner diameter, are provided. The masks 40 and 50 have top surfaces 41 and 51, respectively, in contact with the outlet end 18b of the die 10 and tapered surfaces 43 and 53, respectively faced with the tapered surface 19 of the die 10. The top surfaces 41 and 51 are for controlling the degree of the opening of the feed holes 11a and 11b. Namely, when the mask 40 is used as shown in FIG. 5(a), both of the feed holes 11a and 11b are fully closed. Contrary to this, when the mask 50 is used as shown in FIG. 5(b), the feed hole 11b is fully opened while the feed hole 11a is half closed. In other words, the use of the mask 40 as shown in FIG. 5(a) causes the material in the feed holes 11a and 11b to be blocked by the top surface 41, while the use of the mask 50 as shown in FIG. 5(b) causes the material in the feed holes 11a and 11b to be extruded. As a result, an increase in the amount of the extruded material is obtained when the mask 50 is used, thereby increasing the thickness of the skin 1b of the honeycomb structure.

Furthermore, the tapered surface 43 of the mask 40 is such that the minimum distance $W_2$, which corresponds to the thickness of the skin 1b of the honeycomb structure 1 as obtained, is left between the tapered surface 19 of the die 10 and the tapered surface 43 of the mask 40. Contrary to this, the tapered surface 53 of the mask 50 is such that the minimum distance $W_3$, which also corresponds to the thickness of the skin 1b of the honeycomb structure 1 as obtained and which is smaller than $W_2$, is left between the tapered surface 19 of the die 10 and the tapered surface 53 of the mask 50. As a result, in comparison with the thickness of the skin 1b as obtained when the mask 40 is used, an increased thickness of the skin 1b is obtained when the mask 50 is used. The increase in the thickness of the skin 1b when the mask 50 is used is covered by the material issued from the feed holes 11a and 11b, which are now opened by the top surface 51 of the mask 50.

In short, a use of the mask 50 in place of the mask 40 allows a honeycomb structure to be obtained, which is increased in the thickness of the skin 1b, while keeping the diameter of the honeycomb structure to be unchanged. In other words, a back plate of mask plate at the inlet side of the die for controlling the amount of the material fed to the die, which is essential in the prior art, can be eliminated, which is advantageous in that the working steps needed for changing the thickness of the skin are simplified.

We claim:

1. An extruding apparatus for formation of a honeycomb structure comprising inner cell walls connected with each other and an outer tubular skin for storing therein the cell walls, while integrally connecting the cell walls to the skin, said apparatus comprising:

an extruding die having axially spaced inlet and outlet ends, the extruding die including an inner portion having a plurality of first feed holes opened to said inlet end for receiving a material to be extruded and a plurality of grooves connected to the feed holes and opened to said outlet end for discharging the material, the outlet end having, at an outer periphery of the inner portion, a rearwardly tapered surface, and an outer portion located radially outwardly from the inner portion, the outer portion having a plurality of second feed holes extending between said inlet and outlet ends; and a mask of a ring shape located on one side of the die adjacent the outlet end of the die, so that a skin formation passageway is formed between the die and the mask, the mask having, at an end adjacent the die, an inner tapered surface faced with the tapered surface of the die and an outer flat surface defining a flow control surface which is in contact with the outer portion of the die, so that at least part of said second feed holes are blocked, wherein, in order to allow a degree of the opening of the second feed holes to be controlled by said flow control surface, the apparatus comprises a plurality of masks of different sizes of the flow control surfaces and of different inner diameters of the inner cylindrical surfaces, while maintaining, between the different masks, a predetermined minimum distance between the tapered surface of the die and the tapered surface of the mask, thereby allowing an adjustment of the inner diameter of a product by changing the masks, while keeping a predetermined value of the thickness of the skin of the product.

2. An extruding apparatus according to claim 1, wherein an arrangement of the first and second feed holes is such that the material is introduced into all of the first and second feed holes.

3. An extruding apparatus according to claim 1, wherein the tapered surface of the inner portion and the tapered surface of the mask are arranged so that they are in parallel with each other.

4. An extruding apparatus according to claim 1, wherein the tapered surface of the inner portion and the tapered surface of the mask converge toward each other in the direction of the extrusion of the material.

5. An extrusion apparatus according to claim 1, wherein the first feed holes opened to the tapered surface have an inner diameter which is smaller than that of the remaining first feed holes.

6. An extrusion apparatus according to claim 1, wherein the tapered surface of the die forms an angle of $\alpha$, with respect an end surface of the inner portion adjacent the tapered surface of the die and perpendicular to the direction of extrusion of the material, which is in a range between 30° and 60°.

7. An extrusion apparatus for formation of a honeycomb structure comprising inner cell walls connected with each other and an outer tubular skin for storing therein the cell walls, while integrally connecting the cell walls to the skin, said apparatus comprising:

an extruding die having axially spaced inlet and outlet ends, the extruding die including an inner portion having a plurality of first feed holes opened to said inlet end for receiving a material to be extruded and a plurality of grooves connected to the feed holes and opened to said outlet end for discharging the material, the outlet end having, at an outer periphery of the inner portion, a rearwardly tapered surface, and an outer portion located radially outwardly from the inner portion, the outer portion having a plurality of second feed holes extending between said inlet and outlet ends; and a mask of a ring shape located on one side of the die adjacent the outlet end of the die, so that a skin formation passageway is formed between the die and the mask, the mask having, at an end adjacent the die, an inner tapered surface faced with the tapered surface of the die and an outer flat surface defining a flow control surface which is in contact with the outer portion of the die, so that at least part of said second feed holes are blocked, wherein, in order to allow a degree of the opening of the second feed holes to be controlled by said flow control surface, the apparatus comprises a plurality of the masks of different sizes of the flow control surfaces and of the same inner diameter of the inner cylindrical surfaces, while, between the different masks, the minimum distance between the tapered surface of the die and the tapered surface of the mask is changed, thereby allowing an adjustment of the thickness of the skin of the honeycomb structure as produced, while keeping a predetermined value of the outer diameter of the product.

8. An extruding apparatus according to claim 7, wherein an arrangement of the first and second feed holes is such that the material is introduced into all of the first and second feed holes.

9. An extruding apparatus according to claim 7, wherein the tapered surface of the inner portion and the tapered surface of the mask are arranged so that they are in parallel with each other.

10. An extruding apparatus according to claim 7, wherein the tapered surface of the inner portion and the tapered surface of the mask converge toward each other in the direction of the extrusion of the material.

11. An extruding apparatus according to claim 7, wherein the first feed holes opened to the tapered surface have an inner diameter which is smaller than that of the remaining first feed holes.

12. An extruding apparatus according to claim 7, wherein the tapered surface of the die forms an angle of $\alpha$, with respect an end surface of the inner portion adjacent the tapered surface of the die and perpendicular to the direction of extrusion of the material, which is in a range between 30° and 60°.

* * * * *